(No Model.)
E. STEMPEL.
BATTER CAKE MIXER AND DEPOSITOR.
No. 488,721. Patented Dec. 27, 1892.
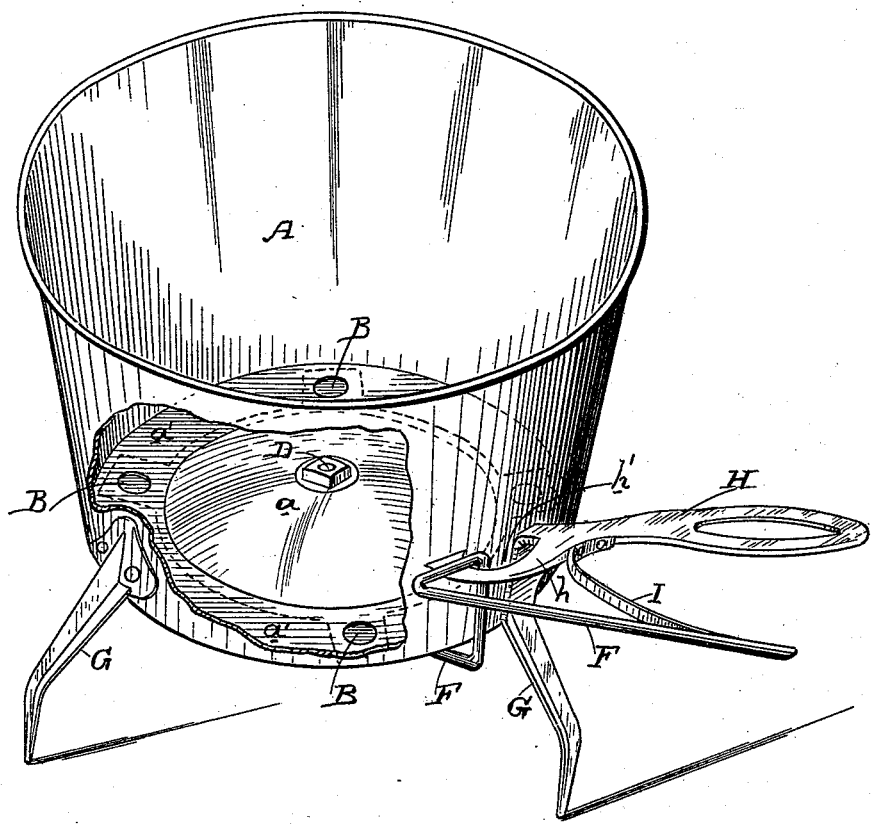
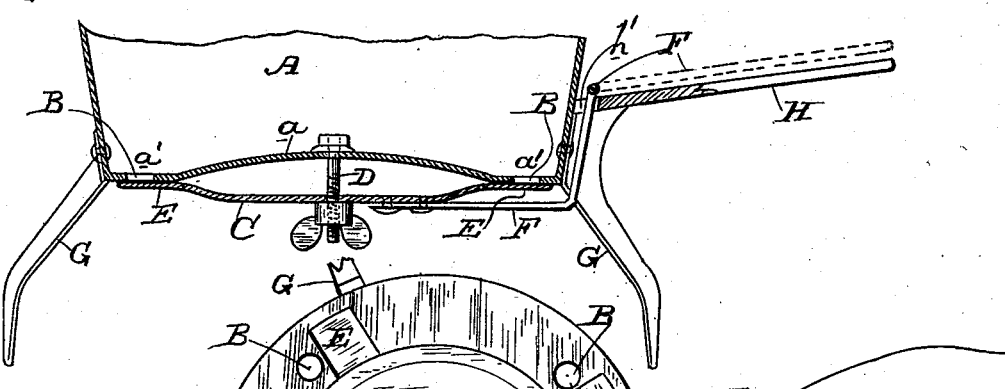
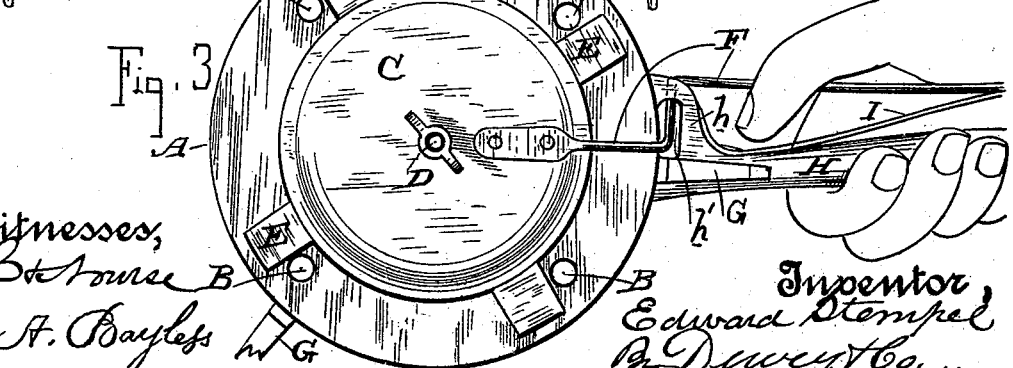

UNITED STATES PATENT OFFICE.

EDWARD STEMPEL, OF ALAMEDA, CALIFORNIA.

BATTER-CAKE MIXER AND DEPOSITOR.

SPECIFICATION forming part of Letters Patent No. 488,721, dated December 27, 1892.

Application filed August 1, 1892. Serial No. 441,851. (No model.)

*To all whom it may concern:*

Be it known that I, EDWARD STEMPEL, a citizen of the United States, residing at Alameda, Alameda county, State of California, have invented an Improvement in Batter-Cake Mixers and Depositors; and I hereby declare the following to be a full, clear, and exact description of the same.

My invention relates to the general class of kitchen utensils, and particularly to a utensil, the object of which is to provide a vessel in which the batter may be mixed, and from which it may be evenly deposited upon the griddle to form any number of cakes.

My invention consists in the novel construction, arrangement and combination of the several parts of the utensil hereinafter fully described and specifically pointed out in the claims.

The object of my invention is to provide a simple, durable and effective utensil in which batter may be mixed, and from which it may be deposited readily and accurately upon the griddle to form a number of cakes at each charge.

Referring to the accompanying drawings for a more complete explanation of my invention,—Figure 1 is a perspective view of my device, a portion of the wall of the receptacle A being broken away to show the interior. Fig. 2 is a cross-section. Fig. 3 is a bottom view.

A is a vessel which forms the body of the utensil. This vessel may be of any suitable material and capacity, and is preferably formed of tin and of a tapering shape, providing for the proper manipulation in mixing the material within it. The bottom of this vessel is raised centrally, as shown at $a$, thereby forming an annular channel $a'$ around the periphery of said bottom. In this channel, which may have a flat surface or otherwise, are made holes B in any suitable number and equi-distant from each other. Under the bottom of the vessel A is seated a plate C which is centrally pivoted to said bottom by the bolt D. This plate may be of any suitable shape and it serves as a valve to control the openings B in the bottom of the vessel. This control may be effected by means of holes made in the plate and adapted to be brought into and carried out of line with the holes B, or as here shown, by means of small pieces E formed with or projecting from the rim of said plate. The valve plate C is adapted to be rotated by any suitable outwardly projecting handle, such as by the rod F secured to it and extending outwardly.

The vessel is mounted upon legs G which are made long and are outwardly flaring as shown. One of these legs is formed preferably in the same casting with the handle H of the utensil, and said casting has formed with or secured to it a side projecting piece $h$ with a guide slot $h'$, in which the valve rod F plays and by which it is limited in its movement thereby controlling the amount of movement of the valves. The valve rod, it will also be seen, is in convenient position to be operated readily from the main handle of the utensil.

Though the valve may be operated in both directions by hand it may, if preferred, be closed by means of a spring I connected with it and with the handle H, in such a manner that by pressing the rod and handle together the valves will open the apertures in the bottom of the vessel, and at the same time will compress the spring; then by relieving the rod of the pressure, the spring will throw it outwardly, and will close the valves.

The operation of the utensil is as follows:— The batter is mixed in the vessel A; then when the griddle is hot the vessel is placed upon the stove over the griddle. The valve rod is then operated, whereby the valve opens the apertures B of the bottom of the vessel, and the batter flows out evenly and is quickly distributed in a suitable number of cakes over the surface of the griddle. The valve being then closed, the vessel is removed from the stove to await the next operation. The outwardly flaring legs of the vessel enable it to be placed over the griddle without interfering with it, and they also provide sufficient space under the vessel to permit of the necessary observation of the amount of batter deposited. The raised center $a$ of the bottom of the vessel provides for the outflow of every bit of the batter to the annular channel or surface $a'$ around the rim of the bottom where the discharge holes are located. It also gives resistance of the bottom of the vessel to the pressure of the pivotal bolt D which must be set up tight to hold the valves closely in place to prevent leakage. The legs of the utensil are preferably riveted on to the vessel so that they may be easily removed for packing. The guide in the handle is simple and of advantage in limiting the movement of the valve rod and the consequent movement of the valves.

Having thus described my invention, what I claim as new and desire to secure by Letters Patent is—

1. A batter cake mixer and depositor comprising a vessel adapted to hold the batter and to be supported above a griddle whereby sufficient space is left below said vessel to inspect the amount of batter deposited, said vessel having discharge openings and provided with a raised bottom, a valve controlling said openings and provided with means whereby it may be adjusted, and means for oscillating said valve, substantially as herein described.

2. A batter cake mixer and depositor, consisting of a vessel in which the batter is mixed said vessel having a bottom formed with discharge openings and having flaring legs by which it is supported above a griddle and sufficient space is left between the vessel and griddle to inspect the amount of batter deposited, an adjustable and oscillating valve fitted to the bottom of the vessel having means by which it may be oscillated, and provided with holes adapted to be aligned with the holes in the bottom of the vessel, substantially as herein described.

3. A batter cake mixer and depositor consisting of a vessel in which the batter is to be mixed, said vessel having the central portion $a$ of its bottom elevated whereby an annular channel or surface is formed about its rim, a series of equi-distant holes formed in said channel or surface, a plate secured to the under surface of the bottom of the vessel and pivoted centrally thereto, radially extending valve pieces projecting from the rim of said plate and adapted to open and close the holes in the bottom of the vessel, and an outwardly extending rod for operating the valve carrying plate, substantially as herein described.

4. A batter cake mixer and depositor consisting of a vessel in which the batter is mixed, said vessel having in its bottom the annular series of equi-distant discharge apertures or holes, the centrally pivoted valve plate controlling said apertures or holes, the outwardly flaring legs of said vessel, one of said legs having the handle and the slotted guide, and the outwardly extending rod connected with the valve plate and passing through the slotted guide, substantially as herein described.

In witness whereof I have hereunto set my hand.

EDWARD STEMPEL.

Witnesses:
S. H. NOURSE,
WM. F. BOOTH.